(12) United States Patent
Saddington

(10) Patent No.: US 8,597,725 B2
(45) Date of Patent: Dec. 3, 2013

(54) METHOD OF TERMITE PROOFING A BUILDING STRUCTURE

(75) Inventor: David Lees Saddington, Merewether (AU)

(73) Assignee: Termortar Pty Ltd, Broadmeadow, New South Wales (AU)

(*) Notice: Subject to any disclaimer, the term of this patent is extended or adjusted under 35 U.S.C. 154(b) by 0 days.

(21) Appl. No.: 13/378,771

(22) PCT Filed: Jun. 17, 2010

(86) PCT No.: PCT/AU2010/000750
§ 371 (c)(1),
(2), (4) Date: Mar. 1, 2012

(87) PCT Pub. No.: WO2010/144963
PCT Pub. Date: Dec. 23, 2010

(65) Prior Publication Data
US 2012/0156367 A1    Jun. 21, 2012

(30) Foreign Application Priority Data
Jun. 19, 2009  (AU) .............................. 2009902838

(51) Int. Cl.
B32B 13/04    (2006.01)
(52) U.S. Cl.
USPC ........ 427/160; 427/256; 427/421.1; 43/132.1
(58) Field of Classification Search
USPC ................ 43/132.1; 427/421.1, 160, 256
See application file for complete search history.

(56) References Cited

U.S. PATENT DOCUMENTS 6,094,857 A * 8/2000 Kennedy et al. ............. 43/132.1
2004/0237459 A1 12/2004 Alesi
(Continued)

FOREIGN PATENT DOCUMENTS

AU    199667810 B2    9/1996
AU    A-351985/97 A   2/1998
(Continued)

OTHER PUBLICATIONS

International Search Report mailed on Jul. 29, 2010 for PCT Patent Application No. PCT/AU2010/000750, 2 pages.
Written Opinion of the International Searching Authority mailed on Jul. 29, 2010 for PCT Patent Application No. PCT/AU2010/000750, 4 pages.
(Continued)

Primary Examiner — Timothy Meeks
Assistant Examiner — Nathan T Leong
(74) Attorney, Agent, or Firm — Kilpatrick Townsend & Stockton LLP

(57) ABSTRACT

A method of termite proofing a building structure (1, 101), the building structure (1, 101) has a foundation (3) located below an adjacent finished ground level (5) and an external wall (2, 102) formed on the foundation (3) and defining an exterior surface (4, 104) of the building structure (1, 101). The exterior surface (4, 104) is defined at least in part by a cementitious material. The method comprises applying a curable composition (9) to the cementitious material throughout a lower region (8, 108) of the exterior surface (4, 104) extending from the foundation (3) to a predetermined height above the finished ground level (5), such that the composition (9) penetrates into and is retained within the cementitious material. The composition is allowed to cure within the cementitious material throughout the lower region (8). The said composition (9) cures within the cementitious material, thereby protecting the cementitious material against intrusion by termites.

14 Claims, 2 Drawing Sheets

(56) References Cited

U.S. PATENT DOCUMENTS

| | | |
|---|---|---|
| 2005/0158354 A1* | 7/2005 | Hannay et al. ............... 424/410 |
| 2006/0101708 A1 | 5/2006 | Cox |
| 2006/0127435 A1 | 6/2006 | Van Voris |

FOREIGN PATENT DOCUMENTS

| | | |
|---|---|---|
| WO | 03/079780 A1 | 10/2003 |
| WO | WO2006012680 A1 | 2/2006 |
| WO | WO2007030875 A1 | 3/2007 |
| WO | 2007/052705 A1 | 5/2007 |

OTHER PUBLICATIONS

Declaration of Anthony William Kennedy in Support of Opposition for Australian Patent Application No. 2010262758, without exhibits, dated Mar. 5, 2013.

Australian Standard No. AS3660.1-2000 entitled "Termite Management Part 1: New Building Work" published 2000.

European Search Report and Written Opinion mailed Oct. 31, 2012 in EP Application No. 10788508.9.

Intellectual Property Office of the Philippines Substantive Examination Report for Application No. 1/2011/502589, 1 page, mailed Jul. 29, 2013.

* cited by examiner

METHOD OF TERMITE PROOFING A BUILDING STRUCTURE

CROSS-REFERENCES TO RELATED APPLICATIONS

This application is a National Stage of International Application No. PCT/AU2010/000750 filed Jun. 17, 2010, and which claims the benefit of Australian Patent Application No. 2009902838, filed Jun. 19, 2009, the disclosures of which are incorporated herein by reference.

TECHNICAL FIELD

The present invention relates to method of termite proofing a building structure.

BACKGROUND OF THE INVENTION

A common method of providing protection for building structures against termites is by the use of physical barriers formed, for example, of stainless steel mesh or aluminium. Alternatively, chemical barriers are often utilised. Chemical barriers may either be in the form of termite poisons or termite repellents.

Metallic barriers are relatively expensive in terms of material and installation costs. Chemical barriers are generally applied at ground level and may be harmful to humans, animals and vegetation. Further, the effectiveness of chemical barriers deteriorates over time.

OBJECT OF THE INVENTION

It is an object of the present invention to substantially overcome or at least ameliorate one or more of the above-mentioned disadvantages or to provide a useful alternative to current termite proofing methods.

SUMMARY OF THE INVENTION

The present invention provides a method of termite proofing a building structure, the building structure having a foundation located below an adjacent finished ground level and an external wall formed on the foundation and defining an exterior surface of the building structure, the exterior surface being defined at least in part by a cementitious material, said method comprising:

applying a curable composition to the cementitious material throughout a lower region of the exterior surface extending from the foundation to a predetermined height above the finished ground level, such that said composition penetrates into and is retained within the cementitious material; and allowing said composition to cure within the cementitious material throughout said lower region, wherein said composition cures within the cementitious material, thereby protecting the cementitious material against intrusion by termites.

In one embodiment, the cementitious material comprises a cementitious render.

In an alternate embodiment, the wall comprises a plurality of courses of masonry elements with mortar joints defined between adjacent masonry elements and between a lowermost course of the masonry elements and the foundation, the mortar joints comprising the cementitious material.

Typically, a majority of said composition penetrates into the cementitious material.

The composition preferably penetrates at least 5 mm into the cementitious material.

A residual film of said composition may initially remain on the exterior surface following application, said residual film breaking down under the action of ultraviolet radiation within a period of six months. The residual film may be at least substantially clear.

The predetermined height may be at least 50 mm or at least 75 mm.

The composition may be applied by spraying.

Alternatively, the composition may be applied by brush or roller.

The composition, when cured, typically hardens the cementitious material.

The composition may comprise one or more treating substances selected from the group consisting of acrylics, modified acrylics, silicones, silanes, urethanes or monomers thereof, silane modified acrylics or urethanes, fluorosilicates, alkyl silicates, metal silicates, epoxy polymers, styrene, styrene-acrylate or styrene-butadiene polymers, vinyl monomers or polymers, and natural or synthetic latexes.

In one embodiment the composition comprises acrylic and silicone polymers.

The composition may comprise a hydrocarbon based solvent.

The composition may comprise a fluorosilicate, metal silicate or alkyl silicate in an aqueous-based solvent.

BRIEF DESCRIPTION OF THE DRAWINGS

Preferred embodiments will now be described, by way of examples only, with reference to the accompanying drawing and the following examples, in which.

DETAILED DESCRIPTION OF THE PREFERRED EMBODIMENTS

Figure 1:
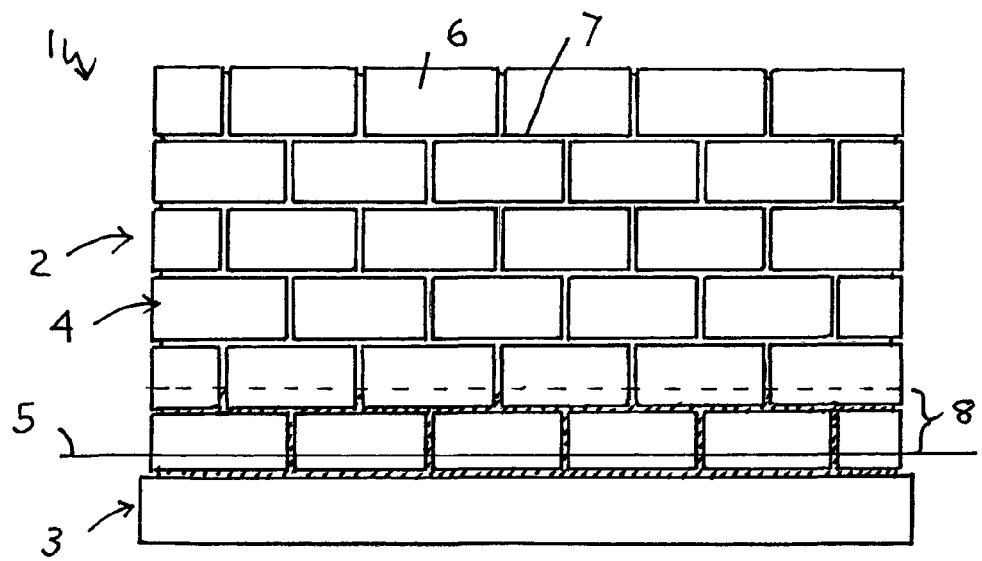
FIG. 1 is a front elevational view of a masonry external wall of a building structure.

FIG. 1 depicts an external wall 2 of a building structure 1 formed on a foundation 3. The external wall 2 defines an exterior surface 4 of the building structure 1. The foundation 3 is here in the form of a concrete slab, but may take any of various known forms. The foundation 3 is typically a ground slab and is located below an adjacent finished ground level 5. The foundation 3 will typically protrude above an adjacent unfinished ground level during construction of the building structure, however the ground level will typically be raised to a finished ground level upon completion of the building structure when landscaping the environs of the building structure so as to hide the foundation from sight, leaving only the wall 2 protruding above finished ground level.

The wall 2 comprises a plurality of courses of exposed masonry elements 6 laid in a known manner. The lowermost course of masonry elements 6 is laid on the foundation 3 with successive courses of masonry elements 6 being laid on top of each other. The masonry elements 6 may be of any suitable form and construction and may include, for example, clay bricks, stone blocks, calcium silicate blocks or concrete blocks.

Mortar joints 7 are defined between adjacent masonry elements 6 and between the lowermost course of masonry elements 6 and the foundation 3. The mortar joints 7 comprise a cementitious material defining part of the exterior surface 4 of the building structure 1. The cementitious material will typically be a standard brick mortar and may consist of a typical mixture of four to eight parts sand, one part cement (generally Portland cement) and one part lime by volume.

The mortar joints 7 are, however, susceptible to intrusion by termites. The termites may remove the sand component of the mortar, grain by grain, and eventually penetrate the mortar joints, thereby allowing access to the interior of the building structure 1 through the gaps formed between the masonry elements 6.

As a result of the susceptibility of the cementitious material forming the mortar joints 7 to termite intrusion, the present method described below is utilised to treat the cementitious material throughout a lower region 8 of the external surface 2, extending from the foundation 3 to a predetermined height above the finished ground level 5 so as to inhibit termites from accessing the interior of the building structure. The predetermined height will typically be at least 50 mm, and more typically at least 75 mm above ground level. Termites are subterranean insects which are usually located at or below ground level and which shun light. Termites typically either attempt to enter building structures below ground level or build dirt tunnels from ground level along above ground surfaces to access entry points above ground level whilst still protecting the termites from light. Such tunnels are able to be visually identified by periodic inspections and, accordingly, it is only necessary to treat the exterior surface from the foundation up to a predetermined height above ground level sufficient for such visual inspection. A predetermined height of approximately 50 mm is typically sufficient, although Australian standards specify a minimum termite protection height of 75 mm.

Figure 3:
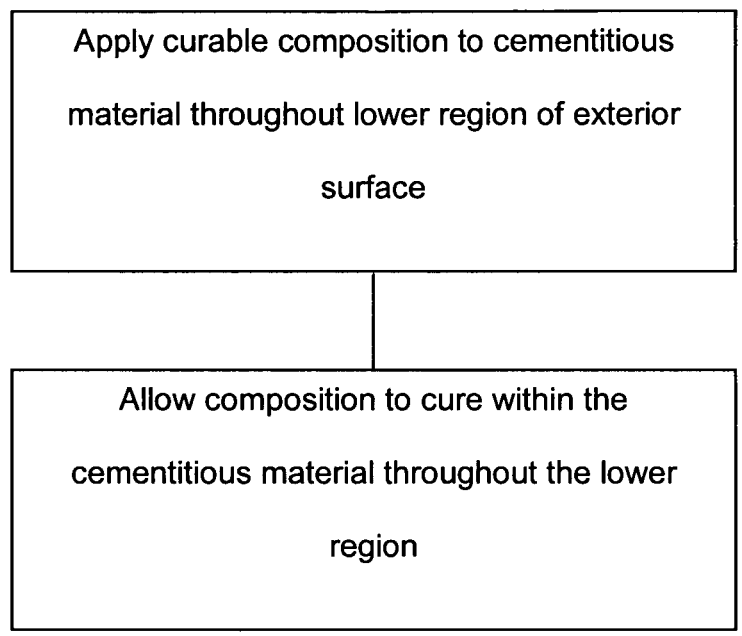
FIG. 3 is a schematic diagram illustrating an embodiment of the method of termite proofing a building structure.

Referring to FIG. 3, the treatment to termite proof the building structure 1 comprises applying a curable composition 9 to the cementitious material forming the mortar joint 7 throughout the lower region 8 such that the composition penetrates into and is retained within the cementitious material. The curable composition 9 is then allowed to cure within the cementitious material throughout the lower region. Curing the composition within the cementitious material protects the cementitious material against intrusion by termites.

The curable composition may be applied by spraying, brush, roller or any other suitable means of application. Given that the masonry elements 6 will generally be termite proof, it is only necessary that the curable composition is applied to the mortar joints throughout the lower region 8 rather than applying the curable composition to the entire exterior surface 2 of the lower region 8. If the curable composition is applied by spray, however, it may be most efficient to spray both the masonry elements 6 and mortar joints 7 throughout the lower region 8.

Figure 2:
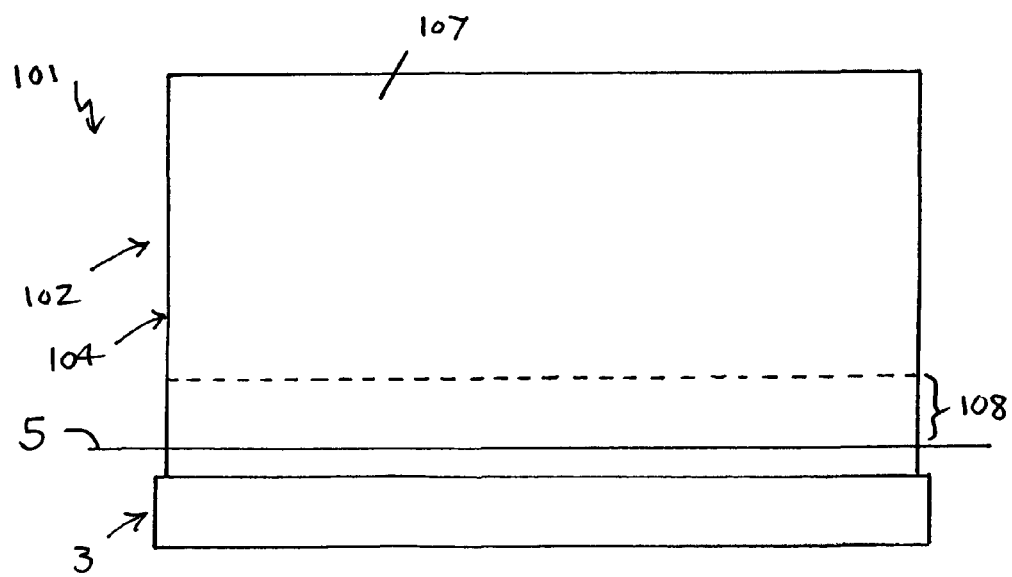
FIG. 2 is a front elevational view of a rendered external wall of a building structure.

FIG. 2 depicts an alternate form of external wall 102 of a building structure 101 formed on a foundation 3. Here the external wall 102 is in the form of a rendered external wall comprising a structural element to which is applied a cementitious render 107 defining an exterior surface 104 of the building structure 101. The foundation 3 is again typically a ground slab located below an adjacent finished ground level 5. The render 107 comprises a cementitious material typically in the form of a standard render that may consist of a typical mixture of four to eight parts of sand, one part cement (generally Portland cement) and one part lime by volume.

The building structure 101 may again be termite proofed according to the method depicted in FIG. 3 by applying a curable composition as discussed above to a lower region 108 of the external surface 104, again extending from the foundation 3 to the predetermined height above the finished ground level 5 such that the composition penetrates into and is retained within the cementitious material. The curable composition 9 is then allowed to cure within the cementitious material with the cementitious material throughout the lower region 108.

The curable composition may be capable of drying to leave a solid residue. It may comprise a solvent and a treating substance. The composition may be a solution of a treating substance in a solvent, or it may be a dispersion, e.g. a suspension, emulsion or microemulsion, of a treating substance in a solvent. The treating substance (in the absence of solvent) may be a solid or it may be curable (e.g. crosslinkable) to form a solid. Thus in some embodiments removal of the solvent leaves a residue of the treating substance, optionally in the form of a film. In other embodiments the treating substance is capable of reacting, for example crosslinking, with the cementitious material, or a component thereof, either on contact with the cementitious material or component thereof or on removal of the solvent. Thus, as used herein, the term 'curable composition' may encompass compositions which cure by loss/evaporation of solvent, by reaction with one or more components of cementitious material, by reaction of components within the composition, or any combination thereof.

The treating substance may be a polymeric substance. It may be a mixture of substances, e.g. a mixture of polymeric substances. Suitable polymeric substances include acrylics (e.g. polyacrylates, polymethacrylates, acrylate/methacrylate copolymers etc.), silicones (e.g. polydimethylsiloxanes, polymethylphenylsiloxanes etc.), silane modified acrylics or urethanes, epoxy polymers, hydrocarbon polymers such as styrene, styrene-acrylate or styrene-butadiene polymers, vinyl monomers or polymers, natural or synthetic latexes etc. It may be for example a mixture of a silicone and an acrylic. The treating substance may be a polymerisable substance. Suitable examples include hydrolysable silanes, e.g. trialkoxysilanes, trioximosilanes etc. which can crosslink on exposure to moisture to form silsesquioxanes.

In some instances the treating substance may be a mixture of one or more polymeric substances with one or more polymerisable substances. Thus it may for example comprise a mixture of a hydrolysable silane with an acrylic polymer.

In other instances the treating substance may comprise polymer precursors which, on curing, react to form the polymer, such as natural or synthetic latexes, and the treating substance may therefore comprise one or more isoprene units or analogs thereof.

In other instances the treating substance may comprise polymer precursors and reactants/polymerisation initiators which, on curing, react to form the polymer, such as a vinyl or urethane polymer.

In other instances the treating substance may comprise one or more compounds which react with the cementitious material or a component thereof, such as unreacted calcium hydroxide, thereby further strengthening the cementitious material and reducing pore sizes. Such treating substances may comprise, for example, fluorosilicates such as magnesium fluorosilicate, metal silicates or alkyl silicates.

The solvent may be any suitable solvent capable of dissolving or dispersing the treating substance. It may be a volatile solvent. It may be aqueous. It may be organic. It may be an aromatic solvent. It may be an ester solvent. It may be a ketone solvent. It may be an ether solvent. It may be a mixed solvent, e.g. a mixed aqueous and organic solvent. It may be, for example, water, toluene, xylene, methyl isobutyl ketone, diglyme, methyl cellosolve, a parrafinnic solvent, propylene carbonate or a mixture of any two or more of these which are miscible with each other.

The solvent and treating substance of the curable composition, or their relative amounts may be selected to ensure penetration of the curable composition well into the cementitious material. According to an embodiment, the curable composition penetrates at least 3 mm into said cementitious material, and more preferably at least 5 mm into said cementitious material. At least a majority, and preferably substantially all, of the curable composition penetrates into the cementitious material. It is envisaged, however, that a residual film of the curable composition may initially remain on the exterior surface (and cure) following application. In one or more embodiments, such a residual film will break down under the action of ultraviolet radiation, typically within a period of six months, leaving the exterior surface of the building structure in its native untreated state. This ensures the exterior surface regains its original appearance throughout the treated lower region in the event that the residual film otherwise affects its appearance, although the residual film will generally be at least substantially clear. The composition cured within the cementitious material, below the exterior surface, will continue to provide termite protection without ultraviolet degradation, in some embodiments potentially up to fifteen years or more.

The curable composition may be hydrophobic, thereby assisting in repelling water from the cementitious material, or at least limiting the penetration of water if any surface film has deteriorated. Water repellency may particularly be desired in damp ground conditions given that the exterior surface of the building structure extends below the finished ground level.

The composition may comprise one or more stabilisers. This may be particularly useful if the composition is a dispersion. The stabiliser may be a dispersion stabiliser. It may be a surfactant.

In an embodiment the composition, once cured, is clear and, in a further embodiment is colourless so that the exterior surface of the building structure is not discoloured.

Suitable curable compositions may be, for example, Silicone S50® (approximately 5% w/v silicone/styrene acrylate/methacrylate combination in hydrocarbon/aromatic solvent system), Diamite® (aqueous solution of magnesium fluorosilicate), 3CC® (aqueous ammonium-based emulsion of blended polymers), Calres® 120 (styrene acrylate polymer in hydrocarbon solvent), LB9® (acrylate/methacrylate copolymer in aromatic solvent), Rockite® (styrene acrylate polymer in hydrocarbon solvent), Caltite® (aqueous ammonium-based emulsion of ammonium stearate, vinyl and ethylene) or Aquapel® (aqueous ammonium-based emulsion of blended hydrophobic polymers), all available from Cementaid, Leichardt, New South Wales, Australia, or Masterseal® 355 (a silane/siloxane combination in aliphatic, cycloparrafinic, aromatic hydrocarbon solvent system) or Masterseal® 1120 (solvent based acrylic sealer) both, available from BASF Construction Chemicals Australia Pty Ltd, Seven Hills, New South Wales, Australia).

According to an embodiment the curable composition is Silicone S50® (Cementaid, Leichardt, New South Wales, Australia).

Curing the curable composition in the cementitious mortar or render is understood to make the mortar/render harder and chemically resistant to the formic acid produced by termites. Also, the treated mortar/render is understood to block any reaction between the formic acid produced by termites and the free lime left in the reaction of cement setting. Thus termites are stopped from removing grains of sand and tunneling through the mortar/render.

Hardness tests conducted using a scratch machine in accordance with Australian Standards AS 3700 with mortar samples treated with the curable composition in the form of Silicone S50® show that the treated mortar is 2 to 4 times harder than untreated mortar. Thus, the treated mortar is essentially transformed into a physical barrier for termites.

Preferred embodiments thus provides a method of termite proofing a building structure which does not involve the use of chemical barriers such as termite poisons or repellents. Instead, the preferred embodiment utilises a cementitious material, such as a render or mortar, as a carrier for a physical barrier for termites, by transforming the render or mortar into such a barrier with the use of a curable composition that becomes an integral part of the render/mortar when cured.

Modifications and variations such as would be understood by a skilled person are deemed to be within the scope of the present invention. It is to be understood that the scope of the invention should not be restricted to the specific example(s) or embodiment(s) described above.

The invention claimed is:

1. A method of termite proofing a building structure, the building structure having a foundation located below an adjacent finished ground level and an external wall formed on the foundation and defining an exterior surface of the building structure, the exterior surface being defined at least in part by a cementitious material, said method comprising:
   applying a curable composition to the cementitious material throughout a lower region of the exterior surface extending from the foundation to a predetermined height above the finished ground level, such that said composition penetrates into and is retained within the cementitious material;
   allowing said composition to cure within the cementitious material throughout said lower region, wherein said composition cures within the cementitious material, thereby protecting the cementitious material against intrusion by termites;
   wherein said composition, when cured, hardens the cementitious material;
   wherein a majority of said composition penetrates into the cementitious material; and
   wherein a residual film of said composition initially remains on the exterior surface following application, said residual film breaking down under the action of ultraviolet radiation within a period of six months.

2. The method of claim 1 wherein the cementitious material comprises a cementitious render.

3. The method of claim 1 wherein the wall comprises a plurality of courses of masonry elements with mortar joints defined between adjacent masonry elements and between a lowermost course of the masonry elements and the foundation, the mortar joints comprising the cementitious material.

4. The method of claim 1 wherein said composition penetrates at least 3 mm into the cementitious material.

5. The method of claim 1 wherein said composition penetrates at least 5 mm into the cementitious material.

6. The method of claim 1 wherein said residual film is at least substantially clear.

7. The method of claim 1 wherein said predetermined height is at least 50 mm.

8. The method of claim 1 wherein said predetermined height is at least 75 mm.

9. The method of claim 1 wherein said composition is applied by spraying.

10. The method of claim 1 wherein said composition is applied by brush or roller.

11. The method of claim 1 wherein said composition comprises one or more treating substances selected from the group consisting of acrylics, modified acrylics, silicones, silanes, urethanes or monomers thereof, silane modified acrylics or urethanes, fluorosilicates, alkyl silicates, metal silicates, epoxy polymers, styrene, styrene-acrylate or styrene-butadiene polymers, vinyl monomers or polymers, and natural or synthetic latexes.

12. The method of claim 1 wherein said composition comprises acrylic and silicone polymers.

13. The method of claim 1 wherein said composition comprises a hydrocarbon based solvent.

14. The method of claim 1 wherein said composition comprises a fluorosilicate, metal silicate or alkyl silicate in an aqueous-based solvent.

* * * * *